US008065270B2

(12) United States Patent
Itai et al.

(10) Patent No.: US 8,065,270 B2
(45) Date of Patent: Nov. 22, 2011

(54) INFORMATION PROCESSING SYSTEM, INFORMATION PROCESSING METHOD, AND MEMORY MEDIUM

(75) Inventors: Daisuke Itai, Yokohama (JP); Kunitaka Ozawa, Utsunomiya (JP); Hiroaki Fujiwara, Utsunomiya (JP); Yoshihiro Kawauchi, Utsunomiya (JP); Hisao Nakagawa, Utsunomiya (JP); Hajime Nakamura, Hiratsuka (JP); Mitsuhiro Masuda, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/716,384

(22) Filed: Mar. 3, 2010

(65) Prior Publication Data
US 2010/0228757 A1 Sep. 9, 2010

(30) Foreign Application Priority Data

Mar. 6, 2009 (JP) ................................. 2009-054065

(51) Int. Cl.
*G06F 7/00* (2006.01)
(52) U.S. Cl. ........ 707/638; 707/636; 707/655; 707/825; 715/229
(58) Field of Classification Search .................. 707/687, 707/638
See application file for complete search history.

(56) References Cited

U.S. PATENT DOCUMENTS

| 2003/0229805 A1* | 12/2003 | Perry | 713/200 |
| 2005/0289166 A1* | 12/2005 | Stanley et al. | 707/100 |
| 2008/0208888 A1* | 8/2008 | Mitchell | 707/102 |

FOREIGN PATENT DOCUMENTS

| JP | 07-013819 A | 1/1995 |
| JP | 2004-110182 A | 4/2004 |

OTHER PUBLICATIONS

Itai, Daisuke, et al, "Information Processing System, Information Processing Method, and Computer-Readable Storage Medium", Specification and Drawings of unpublished related co-pending U.S. Appl. No. 12/716,393, filed Mar. 3, 2010, pp. 1-43.

* cited by examiner

*Primary Examiner* — Shahid Alam
*Assistant Examiner* — Fazlul Quader
(74) *Attorney, Agent, or Firm* — Rossi, Kimms & McDowell LLP

(57) ABSTRACT

An information processing system using apparatus data recorded in a database in accordance with a data definition updated as needed, comprises a storage unit configured to store a data definition history that makes a data definition version and a period during which a data definition for the data definition version was used to correspond to each other, a data definition library in which the data definition version and the data definition for the data definition version are registered in correspondence with each other, and a detection unit configured to detect, from the data definition history, a data definition version of a data definition used in a period designated via a user interface, to detect a data definition for the detected data definition version from the data definition library, and to provide the detected data definition version and data definition to the user interface.

8 Claims, 10 Drawing Sheets

| APPARATUS ID | DATA DEFINITION VERSION | START TIME |
|---|---|---|
| ToolA | DATA DEFINITION VERSION α | 2007 / 01 / 01 |
| | DATA DEFINITION VERSION β | 2007 / 06 / 01 |
| | DATA DEFINITION VERSION 1 | 2007 / 12 / 01 |
| | DATA DEFINITION VERSION 2 | 2008 / 05 / 05 |
| | DATA DEFINITION VERSION 3 | 2008 / 09 / 11 |
| | DATA DEFINITION VERSION 4 | 2008 / 11 / 11 |
| | DATA DEFINITION VERSION 5 | 2008 / 12 / 23 |
| ToolB | DATA DEFINITION VERSION 21 | 2005 / 03 / 01 |
| | DATA DEFINITION VERSION 22 | 2006 / 01 / 01 |
| | DATA DEFINITION VERSION 23 | 2008 / 03 / 10 |

| DATA DEFINITION VERSION 1 | | | | |
|---|---|---|---|---|
| ITEM NAME | FORMAT | UNIT | LOG EXTRACTION SOURCE | COMMENT |
| WAFER X POSITION | VALUE UP TO FIRST DECIMAL PLACE | μm | WAFER X POSITION | |
| WAFER Y POSITION | VALUE UP TO FIRST DECIMAL PLACE | μm | WAFER Y POSITION | |
| ... | ... | ... | ... | ... |

| DATA DEFINITION VERSION 2 | | | | |
|---|---|---|---|---|
| ITEM NAME | FORMAT | UNIT | LOG EXTRACTION SOURCE | COMMENT |
| WAFER X POSITION | INTEGER | nm | WAFER X POSITION | CHANGED FROM μm TO nm FROM THIS VERSION |
| WAFER Y POSITION | INTEGER | nm | WAFER Y POSITION | CHANGED FROM μm TO nm FROM THIS VERSION |
| WAFER X POSITION OFFSET VALUE | INTEGER | nm | WAFER X POSITION OFFSET VALUE | ADDED FROM THIS VERSION |
| WAFER Y POSITION OFFSET VALUE | INTEGER | nm | WAFER Y POSITION OFFSET VALUE | ADDED FROM THIS VERSION |
| ... | ... | ... | ... | ... |

| DATA DEFINITION VERSION 3 | | | | |
|---|---|---|---|---|
| ITEM NAME | FORMAT | UNIT | LOG EXTRACTION SOURCE | COMMENT |
| WAFER X POSITION OFFSET VALUE | INTEGER | nm | WAFER X POSITION OFFSET VALUE | |
| WAFER Y POSITION OFFSET VALUE | INTEGER | nm | WAFER Y POSITION OFFSET VALUE | |
| WAFER X POSITION COLLECTION VALUE | INTEGER | nm | WAFER X POSITION COLLECTION VALUE | CHANGED FROM "WAFER X POSITION" FROM THIS VERSION |
| WAFER Y POSITION COLLECTION VALUE | INTEGER | nm | WAFER Y POSITION COLLECTION VALUE | CHANGED FROM "WAFER Y POSITION" FROM THIS VERSION |
| ... | ... | ... | ... | ... |

| DATE | WAFER X POSITION | WAFER Y POSITION | WAFER X POSITION OFFSET VALUE | WAFER Y POSITION OFFSET VALUE | WAFER X POSITION CORRECTION VALUE | WAFER Y POSITION CORRECTION VALUE | |
|---|---|---|---|---|---|---|---|
| 2008/1/1 | 0.8 | 1.5 | | | | | DATA DEFINITION VERSION 1 |
| ... | 0.8 | 1.5 | | | | | |
| ... | 0.8 | 1.5 | 702 | 712 | | | |
| ... | 0.8 | 1.5 | | | | | |
| 2008/5/1 | 0.8 | 1.5 | | | | 713 | |
| ... | 0.8 | 1.5 | | | | | |
| ... | 0.8 | 1.5 | | | | | |
| 2008/5/5 | 800 | 1500 | 200 | 700 | | | DATA DEFINITION VERSION 2 |
| ... | 800 | 1500 | 200 | 700 | | | |
| ... | 800 | 1500 | 200 | 700 | | | |
| ... | 800 | 1500 | 200 | 700 | | | |
| ... | 800 | 1500 | 200 | 700 | | | |
| ... | 800 | 1500 | 200 | 700 | | | |
| ... | 800 | 1500 | 200 | 700 | | | |
| ... | 800 | 1500 | 200 | 700 | | | |
| 2008/9/11 | | | 200 | 700 | 800 | 1500 | DATA DEFINITION VERSION 3 |
| ... | | | 200 | 700 | 800 | 1500 | |
| 2008/9/20 | | | 200 | 700 | 800 | 1500 | |
| ... | | | 200 | 700 | 800 | 1500 | |
| ... | | | 200 | 700 | 800 | 1500 | |
| ... | | | 200 | 700 | 800 | 1500 | |
| ... | | | 200 | 700 | 800 | 1500 | |
| ... | | | 200 | 700 | 800 | 1500 | |
| ... | | | 200 | 700 | 800 | 1500 | |
| ... | | | 200 | 700 | 800 | 1500 | |
| ... | | | 200 | 700 | 800 | 1500 | |
| 2008/10/1 | | | 200 | 700 | 800 | 1500 | |

EXTRACTION PERIOD 703, 711

704 —

| DATE | WAFER X POSITION | WAFER Y POSITION | WAFER X POSITION OFFSET VALUE | WAFER Y POSITION OFFSET VALUE |
|---|---|---|---|---|
| 2008/5/1 | 0.8 | 1.5 | | |
| ... | 0.8 | 1.5 | | 722 |
| ... | 0.8 | 1.5 | 731 | |
| 2008/5/5 | 800 | 1500 | 200 | 700 |
| ... | 800 | 1500 | 200 | 700 |
| ... | 800 | 1500 | 200 | 700 |
| ... | 800 | 1500 | 200 | 700 |
| ... | 800 | 1500 | 200 | 700 |
| ... | 800 | 1500 | 200 | 700 |
| ... | 800 | 1500 | 200 | 700 |
| ... | 800 | 1500 | 200 | 700 |
| 2008/9/11 | | | 200 | 700 |
| ... | | | 200 | 700 |
| 2008/9/20 | | | 200 | 700 |

| | |
|---|---|
| DATA DEFINITION VERSION 1 | 2007 / 12 / 1 - 2008 / 5 / 4 |
| DATA DEFINITION VERSION 2 | 2008 / 5 / 5 - 2008 / 9 / 10 |
| DATA DEFINITION VERSION 3 | 2008 / 9 / 11 - 2008 / 11 / 11 |

| DATA DEFINITION VERSION 1 | | | | |
|---|---|---|---|---|
| ITEM NAME | FORMAT | UNIT | LOG EXTRACTION SOURCE | COMMENT |
| WAFER X POSITION | VALUE UP TO FIRST DECIMAL PLACE | μm | WAFER X POSITION | |
| WAFER Y POSITION | VALUE UP TO FIRST DECIMAL PLACE | μm | WAFER Y POSITION | |

| DATA DEFINITION VERSION 2 | | | | |
|---|---|---|---|---|
| ITEM NAME | FORMAT | UNIT | LOG EXTRACTION SOURCE | COMMENT |
| WAFER X POSITION | INTEGER | nm | WAFER X POSITION | CHANGED FROM μm TO nm FROM THIS VERSION |
| WAFER Y POSITION | INTEGER | nm | WAFER Y POSITION | CHANGED FROM μm TO nm FROM THIS VERSION |
| WAFER X POSITION OFFSET VALUE | INTEGER | nm | WAFER X POSITION OFFSET VALUE | ADDED FROM THIS VERSION |
| WAFER Y POSITION OFFSET VALUE | INTEGER | nm | WAFER Y POSITION OFFSET VALUE | ADDED FROM THIS VERSION |

| CONTROL SOFTWARE VERSION | DATA DEFINITION VERSION |
|---|---|
| Tool Type 00 Control Ver.1 | DATA DEFINITION VERSION 1 |
| Tool Type 00 Control Ver.2 | DATA DEFINITION VERSION 2 |
| Tool Type 00 Control Ver.3 | DATA DEFINITION VERSION 3 |
| Tool Type 00 Control Ver.4 | |
| Tool Type 00 Control Ver.5 | |

INFORMATION PROCESSING SYSTEM, INFORMATION PROCESSING METHOD, AND MEMORY MEDIUM

BACKGROUND OF THE INVENTION

1. Field of the Invention

The present invention relates to an information processing system, information processing method, and memory medium using apparatus data recorded in a database in accordance with a data definition updated as needed.

2. Description of the Related Art

A semiconductor manufacturing apparatus for manufacturing a semiconductor device generates many apparatus data during processes for manufacturing a semiconductor device. The apparatus data include, e.g., data associated with events generated in the semiconductor manufacturing apparatus, and data representing measurement results. The apparatus data are recorded in a shared database and can be used to detect abnormalities, carry out status diagnosis, and in the analyzing the cause of abnormalities in the semiconductor manufacturing apparatus.

Further micropatterning, higher throughputs, and the like are constantly being sought concerning semiconductor manufacturing apparatuses. To achieve this, operators frequently exchange or add units such as a measuring unit, and improve control software.

Along with this, the name, unit, or number of significant figures of apparatus data output from a semiconductor manufacturing apparatus may be changed depending on the control software version.

A change of apparatus data upon a change of control software may affect data extraction. For example, apparatus data, which could be extracted before, may not be able to be extracted from one time. A change of the unit may cause an analysis error.

Japanese Patent Laid-Open No. 2004-110182 discloses a method of converting data at a data extraction source in conformity with the data specifications at a data extraction destination in accordance with the contents of conversion processing registered in a data conversion library and a conversion relationship defined in an item conversion map.

However, Japanese Patent Laid-Open No. 2004-110182 does not disclose a method of managing and using a data definition and its version in correspondence with a period during which apparatus data was recorded in accordance with the data definition.

SUMMARY OF THE INVENTION

The present invention provides a user with a data definition and its version used to record apparatus data in an information processing system using apparatus data recorded in a database in accordance with a data definition that is updated as needed.

One of the aspects of the present invention provides an information processing system using apparatus data recorded in a database in accordance with a data definition updated as needed, the system comprising a storage unit configured to store a data definition history that makes a data definition version and a period during which a data definition for the data definition version was used to correspond to each other, a data definition library in which the data definition version and the data definition for the data definition version are registered in correspondence with each other, and a detection unit configured to detect, from the data definition history, a data definition version of a data definition used in a period designated via a user interface, to detect a data definition for the detected data definition version from the data definition library, and to provide the detected data definition version and data definition to the user interface, wherein the apparatus data includes either of data generated by a semiconductor manufacturing apparatus and data obtained by processing the generated data.

According to the present invention, for example, the user can be provided with a data definition and its version used to record apparatus data in an information processing system using apparatus data recorded in a database in accordance with a data definition updated as needed. For example, the user can recognize a data definition in each period, and extract and analyze data based on the data definition.

Further features of the present invention will become apparent from the following description of exemplary embodiments with reference to the attached drawings.

BRIEF DESCRIPTION OF THE DRAWINGS

FIG. 5 is a table exemplifying a data definition history;

FIG. 6 is a table exemplifying a detected data definition;

FIG. 7 is a table exemplifying apparatus data;

FIG. 8 is a table exemplifying a detected data definition history;

FIG. 9 is a table exemplifying a data definition corresponding to an extracted apparatus data item;

FIG. 11 is a table exemplifying the correspondence between the control software version and the data definition version.

DESCRIPTION OF THE EMBODIMENTS

Preferred embodiments of the present invention will now be described with reference to the accompanying drawings.

First Embodiment

Figure 2:
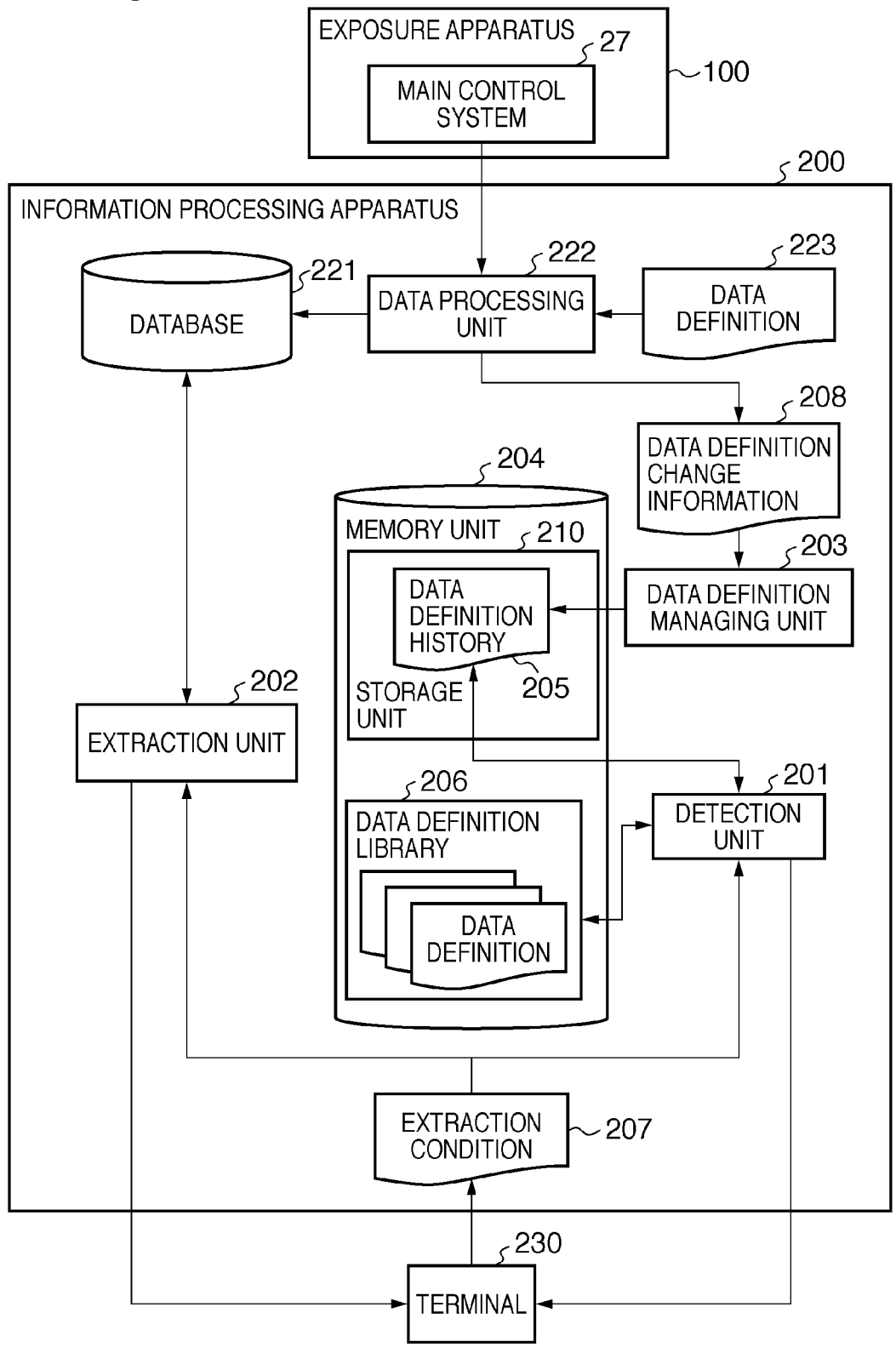
FIG. 2 is a block diagram showing the schematic arrangement of an information processing system according to the first embodiment.

An information processing system according to the first embodiment of the present invention will be described with reference to FIG. 2. The information processing apparatus according to the first embodiment of the present invention uses apparatus data recorded in a database in accordance with a data definition updated as needed. The information processing system includes an information processing apparatus 200, and can typically include one or a plurality of terminals 230. The terminal 230 functions as a user interface. When the information processing apparatus 200 has a user interface function, the terminal 230 is not indispensable. The information processing apparatus 200 can be formed from one or a plurality of computers. A system containing the information processing system and a semiconductor manufacturing apparatus can be called a semiconductor manufacturing system. The term "semiconductor" includes, for example, a device in which electronic circuits are formed on a semiconductor substrate, and a flat panel display device such as a liquid crystal display. The semiconductor manufacturing apparatus can be an apparatus for manufacturing a device in which electronic circuits are formed on a semiconductor substrate. Alternatively, the semiconductor manufacturing apparatus can be an apparatus for manufacturing a flat panel display.

The information processing apparatus 200 or information processing system receives apparatus data from one or a plurality of semiconductor manufacturing apparatuses (exposure apparatus 100 in this case) via a communication interface (not shown) and a communication network (or communication line). The apparatus data can be data generated in a semiconductor manufacturing apparatus represented by the exposure apparatus 100 or data obtained by processing the generated data. Examples of the semiconductor manufacturing apparatus are a deposition apparatus (e.g., plasma deposition apparatus), etching apparatus, annealing apparatus, ion implantation apparatus, cleaning apparatus, coater/developer (coating/developing apparatus), and inspection apparatus, in addition to the exposure apparatus 100 to be exemplified in detail below.

The exposure apparatus 100 will be explained with reference to FIG. 1. The exposure apparatus 100 projects the pattern of a reticle (original) onto a substrate such as a wafer or plate via a projection optical system, and exposes the wafer. In the example shown in FIG. 1, the exposure apparatus 100 is configured as a scanning exposure apparatus. Note that the exposure apparatus 100 described here is merely an example of the exposure apparatus and further merely an example of the semiconductor manufacturing apparatus.

In the exposure apparatus 100, an illumination optical system 2 adjusts the shape and light quantity distribution of a light beam emitted by a light source 1. The light beam illuminates a reticle (original) 3 held on a reticle stage 6. A projection optical system 4 projects the pattern of the reticle 3 onto a wafer (substrate) 5 which is held by a wafer chuck 8 on a wafer stage 7 and coated with a photoresist (resist). The shot region of the wafer 5 is exposed to form (transfer) a latent pattern corresponding to the pattern of the reticle 3 on the photoresist-applied portion. After forming the latent pattern in all the shot regions of the wafer 5, the latent pattern is developed in the development process, forming a resist pattern.

The illumination optical system 2 can include a plurality of numerical apertures (NAs) with different areas of circular apertures to set the value of a coherence factor σ. The illumination optical system 2 can also include a ring-shaped stop for annular illumination, a quadrupole stop, and a mechanism (e.g., a plurality of ND filters and a mechanism for switching them) for adjusting the illumination light quantity. The illumination optical system 2 can further include a light quantity detector for measuring the light quantity, a slit which determines the shape of a light beam, a blind inserted at a position conjugate to the reticle 3 to ensure the illumination range, and a driving mechanism for driving it. The operations of the light source 1 and illumination optical system 2 are controlled in accordance with an instruction from an illumination system control system 21.

The projection optical system 4 can include a numerical aperture setting mechanism for setting the numerical aperture, and a lens driving mechanism for correcting aberration. A projection optical system control system 24 controls the operation of the projection optical system 4.

A reticle stage measuring system 10 measures positions of the reticle stage 6 along two perpendicular axes (X and Y directions) on a plane perpendicular to the optical axis (Z direction) of the projection optical system 4, and rotations of the reticle stage 6 around these axes. A reticle stage control system 22 controls the position of the reticle stage 6.

A TTR (Through The Reticle) observation optical system 9 can be interposed between the illumination optical system 2 and the reticle stage 6. The TTR observation optical system 9 can simultaneously observe a mark on the reticle 3 or a stage reference mark attached to the reticle stage 6, and a stage reference mark attached to the wafer stage 7 via the projection optical system 4. The TTR observation optical system 9 can measure positions of the reticle stage 6, reticle 3, and wafer stage 7 along the optical axis (Z direction) of the projection optical system 4, positions of them along two perpendicular axes (X and Y directions) on a plane perpendicular to the optical axis, and rotations of them around these axes.

A wafer stage measuring system 12 and alignment measuring system 30 can measure the position of the wafer 5. The wafer stage measuring system 12 measures, for example, positions of the wafer 5 along the optical axis (Z direction) of the projection optical system 4, positions of the wafer 5 along two perpendicular axes (X and Y directions) on a plane perpendicular to the optical axis, and rotations of the wafer 5 around these axes. The alignment measuring system 30 can measure the surface position of the wafer 5 along the optical axis (Z direction) of the projection optical system 4. A wafer stage control system 25 controls the position of the wafer stage 7 based on information provided from the wafer stage measuring system 12 and alignment measuring system 30.

The exposure apparatus 100 can include an off-axis observation optical system 11 capable of observing and measuring the surface of the wafer 5 with non-exposure light. The off-axis observation optical system 11 observes a plurality of marks on the wafer 5 and measures a pattern position and shape on the wafer 5. The off-axis observation optical system 11 also observes a stage reference mark on the wafer stage 7 and measures the position of the stage reference mark.

Figure 1:
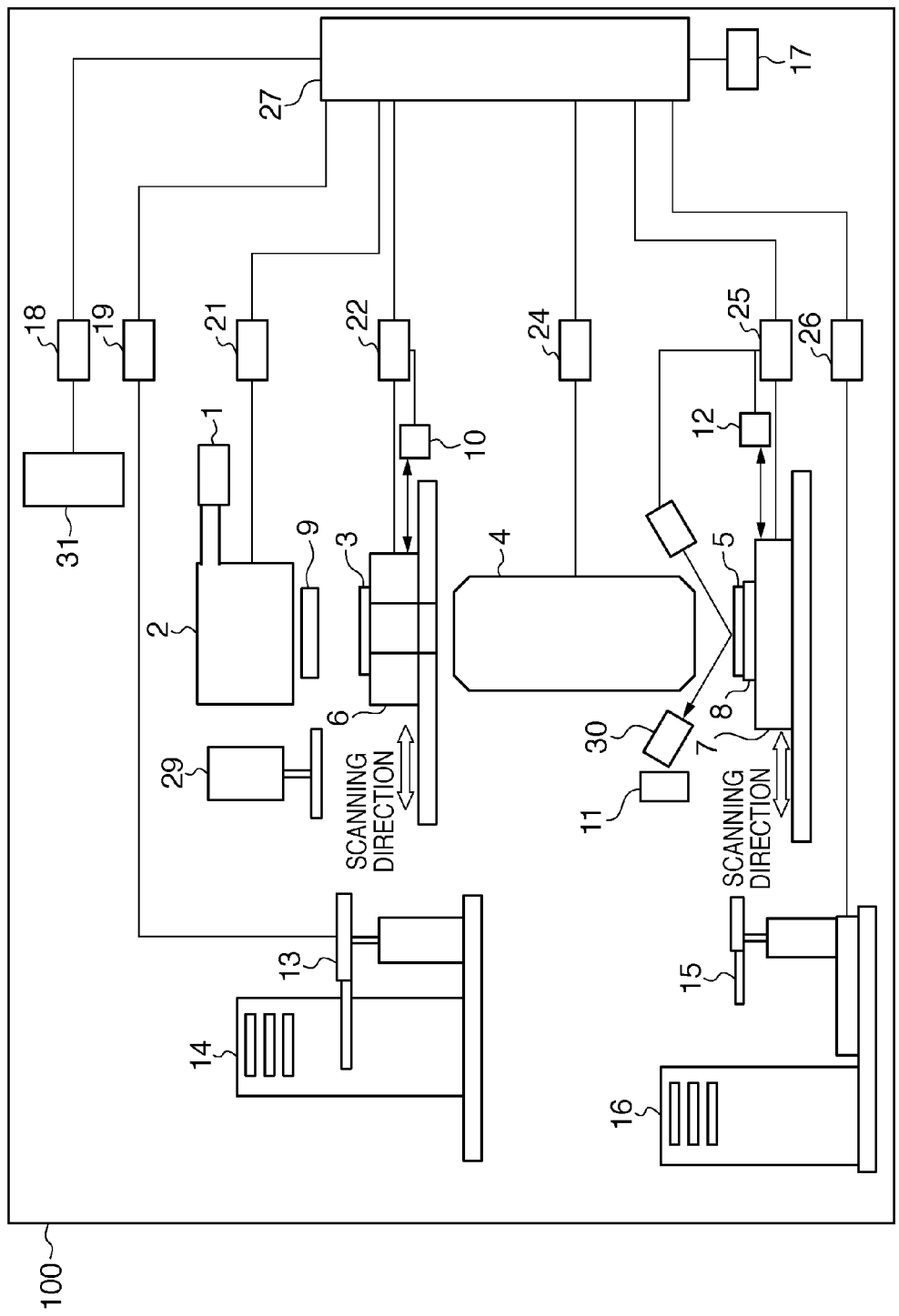
FIG. 1 is a view exemplifying the schematic arrangement of an exposure apparatus serving as an example of a semiconductor manufacturing apparatus.

When exposing the wafer 5, the reticle 3 held on the reticle stage 6 is driven in a "scanning direction" shown in FIG. 1. In synchronism with this, the wafer 5 held on the wafer stage 7 is driven in a "scanning direction" shown in FIG. 1, too. The reticle 3 and wafer 5 are driven at a speed ratio corresponding to the projection magnification of the projection optical system 4. If the relative positions of the reticle 3 and wafer 5 shift from each other, a deformed pattern is transferred in the shot region of the wafer 5. To correct it, a main control system 27 calculates the relative positional error between the reticle 3 and the wafer 5, and controls the reticle stage control system 22 and wafer stage control system 25 to cancel the relative positional error.

The exposure apparatus 100 can comprise a reticle transport unit including a reticle library 14 and reticle robot 13, and a reticle alignment unit 29 which aligns the position of the reticle 3 to a mark on the reticle stage 6. The reticle transport unit operates in accordance with an instruction from a reticle transport control system 19. The exposure apparatus 100 can comprise a wafer transport unit including a wafer cassette elevator 16 and wafer loading/unloading robot 15. The wafer transport unit operates in accordance with an instruction from a wafer transport control system 26.

A chamber environment control unit 31 maintains, e.g., the temperature of air constant in a chamber storing the main body of the exposure apparatus 100. In addition, the chamber environment control unit 31 removes small foreign substances via a filter. The chamber environment control unit 31 operates in accordance with an instruction from a chamber control system 18.

The main control system 27 controls the building components of the exposure apparatus 100, e.g., the chamber control system 18, reticle transport control system 19, wafer transport control system 26, reticle stage control system 22, wafer stage control system 25, illumination system control system 21, projection optical system control system 24, and the like. The main control system 27 can acquire setting parameters that define the exposure operation of the exposure apparatus 100, or an operation instruction via a communication interface 17, and control the building components of the exposure apparatus 100 based on the acquired parameters or instruction.

Exposure processing is executed based on job parameters that define the operation of the exposure apparatus 100. The job parameters include, e.g., the process name (job name), lot ID, shot range, shot array, shot number, exposure, exposure scanning speed, exposure scanning direction, calibration item of a building unit of the exposure apparatus, and wafer and shot alignment methods.

One lot includes one or a plurality of wafers. The main control system 27 executes exposure processing for each lot while controlling the building components of the exposure apparatus 100 based on job parameters. At the start of lot processing, a reticle and wafer for use in exposure processing are supplied into the exposure apparatus 100. Upon completion of supplying the reticle and wafer, building components designated by job parameters out of the building components of the exposure apparatus 100 are calibrated and measured for alignment of the reticle and wafer. While controlling the building components based on the results, the main control system 27 exposes each shot region on the wafer by a step & scan method.

At the same time as exposure processing, the main control system 27 generates a log that records the operation of the exposure apparatus 100 during the exposure processing. The log records events such as the start and end events of the operation of each building component, the setting value of processing, calibration and alignment measurement results, a shot region exposure result, a scan operation control result, and an error generated in the exposure apparatus. The log also records the generation times of these events. The main control system 27 executes processing according to control software that defines processing to be executed. The control software can define even contents to be recorded in the log. Every time the control software is changed, a version identifier is added to the control software.

A method of providing a user with a data definition in each period in the use of a database 221 in which the data definition changes in each period because it is updated, as needed, will be explained.

The information processing apparatus 200 can process apparatus data provided from the exposure apparatus 100. The information processing apparatus 200 can be configured by, for example, installing a computer program in a general-purpose computer. The computer program can be stored in a memory medium. By installing the computer program, the information processing apparatus 200 operates as an apparatus including a communication interface (not shown), a detection unit 201, an extraction unit 202, a data definition managing unit 203, a memory unit 204, the database 221, and a data processing unit 222. Alternatively, by installing the computer program, the information processing apparatus 200 operates as an apparatus which executes a communication step, detection step, extraction step, data definition managing step, storage step, and the like.

Based on a data definition history 205 in the memory unit 204, the detection unit 201 specifies a data definition version in one or a plurality of periods falling within an extraction period (period during which apparatus data should be extracted) contained in extraction conditions requested by the terminal 230. The detection unit 201 detects, from a data definition library 206, a data definition in one or a plurality of periods falling within an apparatus data extraction period contained in extraction conditions requested by the terminal 230. The detection unit 201 transmits or provides the specified data definition version and detected data definition to the terminal 230 serving as a user interface. As the data definition, only contents corresponding to apparatus data item names which can be designated as extraction conditions requested by the terminal 230 may be detected and transmitted or provided to the terminal 230.

The extraction unit 202 extracts, from the database 221, apparatus data corresponding to extraction conditions requested by the terminal 230, and transmits or provides the apparatus data to the terminal 230. The extraction conditions include at least the extraction period and can include an apparatus data item name and the like.

The data definition managing unit 203 generates or updates the data definition history 205 based on data definition change information 208 obtained by the data processing unit 222. The data definition managing unit 203 records the data definition history 205 in a storage unit 210 whose area is ensured in the memory unit 204. The data definition history 205 may be generated for each exposure apparatus. Generation of the data definition history will be explained. To generate a data definition history, every time the data definition is changed, the data processing unit 222 provides the data definition managing unit 203 with the data definition change information 208 describing the definition version number of a changed data definition 223 and the date and time when the use of the data definition 223 started. Based on the data definition change information 208, the data definition managing unit 203 generates or updates the data definition history 205 as exemplified in FIG. 5, and records it in the memory unit 204. In the first embodiment, the memory unit 204 includes the storage unit 210 storing the data definition history 205, and the data definition library 206 in which a data definition version and a data definition for the data definition version are registered in correspondence with each other. The data definition managing unit 203 can update the data definition library 206. For example, upon a change of the data definition (input of the data definition 223), the data definition managing unit 203 can register a new data definition 223 in the data definition library 206 in correspondence with the data definition version of the new data definition 223.

The data processing unit 222 generates apparatus data by processing, in accordance with the data definition 223, a log that is generated by the exposure apparatus 100 (main control system 27) and provided to the information processing apparatus 200. The data processing unit 222 records the apparatus data in the database 221. The log that is generated by the exposure apparatus 100 (main control system 27) and provided to the information processing apparatus 200 may be recorded directly as apparatus data in the database 221. In this case, the exposure apparatus 100 converts raw data into a log of a format complying with the data definition 223. The data processing unit 222 can record the log supplied from the information processing apparatus 200 directly in the database 221. In this example, the data processing unit 222 generates apparatus data by processing, in accordance with the data definition 223, a log that is generated by the exposure apparatus 100 (main control system 27) and provided to the information processing apparatus 200.

Figure 3:
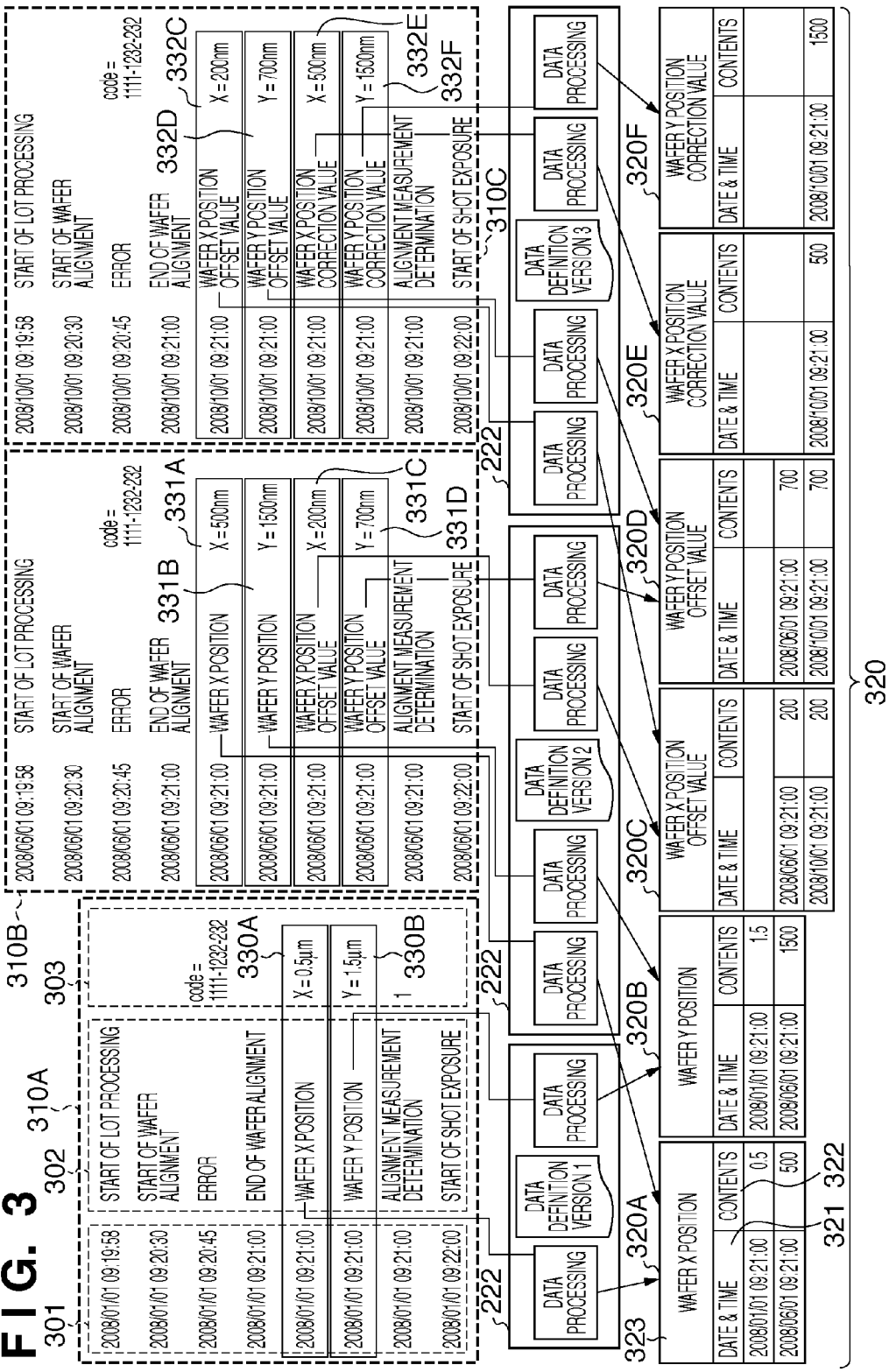
FIG. 3 is a view exemplifying apparatus data which can be generated by a data processing unit based on the log.

The data definition 223 defines, for example, item names assigned to respective data representing events and measurement values contained in the log generated by the main control system 27, formats to record the respective data, and the units of the respective data. A version number is added to the data definition 223 every time the data definition 223 is changed. FIG. 3 exemplifies apparatus data that can be generated by the data processing unit 222 based on the log. Logs 310A to 310C are examples of logs generated by the main control system 27. Each log contains a processing time 301, operation record identifier 302, and record content 303. The data definition defines, e.g., data storage arrays 320A to 320F for storing data of items corresponding to the respective operation record identifiers 302, a date & time field 321 for storing the processing time 301, and a content field 322 for storing the record content 303. Reference numeral 320 denotes an example of apparatus data generated by the data processing unit 222.

The log 310A is assumed to have been generated by the main control system 27 when control software executed by the main control system 27 is "Tool Type 00 Control Ver.1". In accordance with a data definition for a data definition version "data definition version 1", the data processing unit 222 records information 330A and information 330B, which form the log 310A, as apparatus data 320A and apparatus data 320B in the database 221, respectively.

The time has elapsed and the control software is assumed to have changed to "Tool Type 00 Control Ver.2". The log 310B is recorded in the database 221 as apparatus data complying with a format defined by "Tool Type 00 Control Ver.2". The control software "Tool Type 00 Control Ver.1" and the control software "Tool Type 00 Control Ver.2" are different in the following points: the units of the wafer X position and wafer Y position change from μm to nm, and "wafer X position offset" and "wafer Y position offset" are added. To cope with these differences, the data definition version is changed to "data definition version 2". According to data definition version 2, the data processing unit 222 records pieces of information 331A, 331B, 331C, and 331D, which form the log 310B, as apparatus data 320A, 320B, 320C, and 320D in the database 221.

The time has further elapsed and the control software is assumed to have changed to "Tool Type 00 Control Ver.3". The log 310C is recorded in the database 221 as apparatus data complying with a format defined by "Tool Type 00 Control Ver.3". The control software "Tool Type 00 Control Ver.2" and the control software "Tool Type 00 Control Ver.3" are different in the following points: "wafer X position" and "wafer Y position" are deleted, and "wafer X position correction value" and "wafer Y position correction value" are added as information in place of "wafer X position" and "wafer Y position". To cope with these differences, the data definition version is changed to "data definition version 3". According to data definition version 3, the data processing unit 222 records pieces of information 332C, 332D, 332E, and 332F, which form the log 310C, as apparatus data 320C, 320D, 320E, and 320F in the database 221.

Apparatus data generated by the data processing unit 222 is recorded in the database 221 together with information which specifies the exposure apparatus 100, e.g., an apparatus recognition ID. To generate a data definition history, when the data definition is changed, the data processing unit 222 provides the data definition managing unit 203 with the data definition change information 208 describing the definition version number of the changed data definition and the date and time when the use of the data definition started. The data definition may differ between exposure apparatuses. The data definition change information 208 may be provided to the data definition managing unit 203 together with information which specifies an exposure apparatus.

Figure 4:
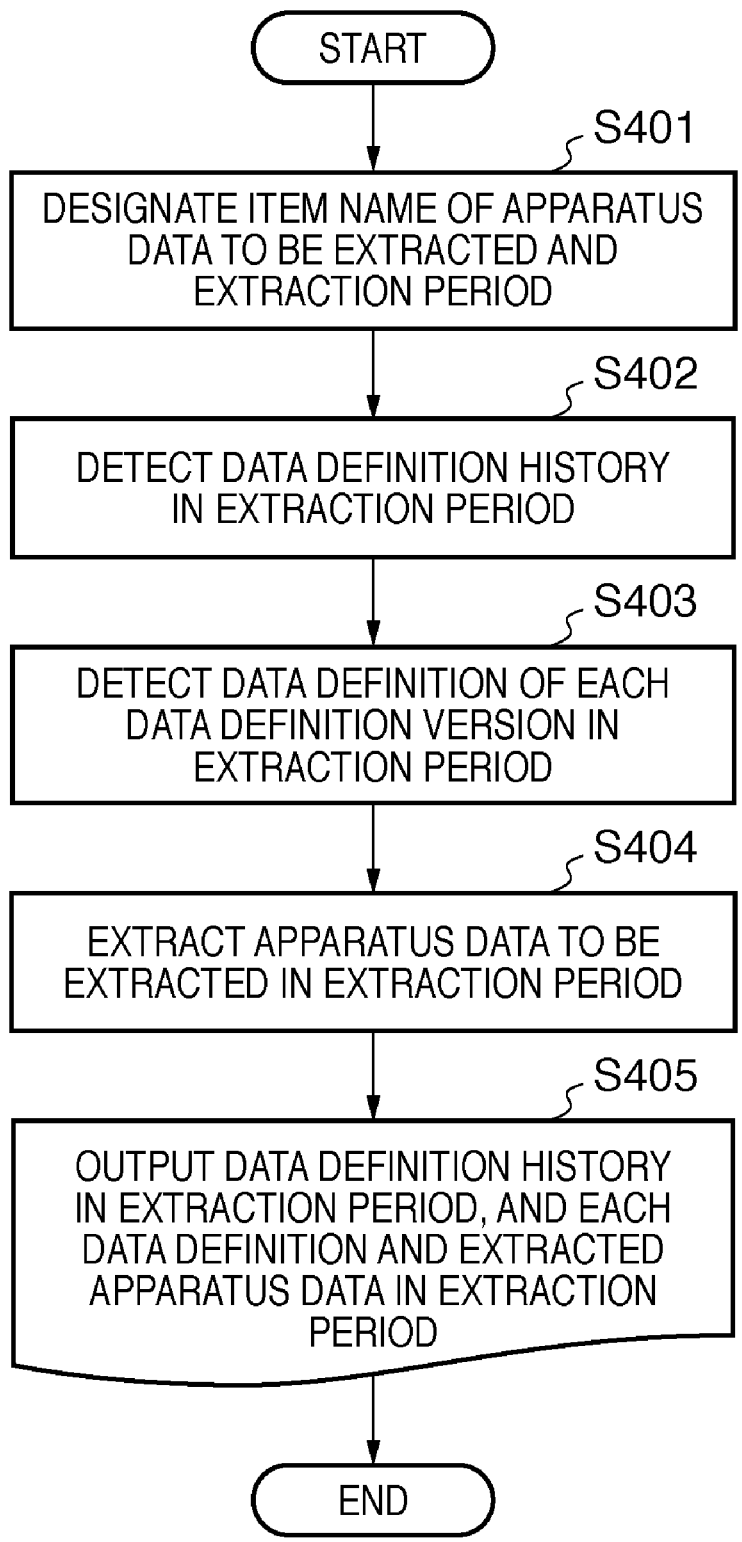
FIG. 4 is a flowchart exemplifying the sequence of information processing in the information processing apparatus or the information processing system including it according to the first embodiment.

The sequence of information processing in the information processing apparatus 200 or the information processing system including it according to the first embodiment will be explained with reference to FIG. 4. In step S401, the terminal 230 provides the information processing apparatus 200 with an apparatus recognition ID, the item names of apparatus data to be extracted, and a period to be extracted as extraction conditions 207 for extracting target apparatus data of the exposure apparatus 100 from the database 221. As the item names of apparatus data to be extracted, for example, events such as the start and end events of each processing operation and an error event, an operation result, a measurement result, and the like can be designated. For example, an apparatus with an apparatus recognition ID "Tool A" can be designated as the exposure apparatus 100 to be extracted. "Wafer X position", "wafer Y position", "wafer X position offset", and "wafer Y position offset" can be designated as item names to be extracted. For example, a period of 2008 May 1 to 2008 Sep. 20 can be designated as a period to be extracted.

In step S402, the detection unit 201 detects a data definition version in the designated extraction period by referring to the data definition history 205 for "apparatus Tool A" recorded in the memory unit 204. FIG. 5 exemplifies the data definition history 205. When at least part of the extraction period belongs to a period of 2007 Dec. 1 to 2008 May 4, data definition version in is detected as the data definition version. When at least part of the extraction period belongs to a period of 2008 May 5 to 2008 Sep. 10, the detected data definition version contains "data definition version 2". When at least part of the extraction period belongs to a period of 2008 Sep. 11 to 2008 Nov. 11, the detected data definition version contains "data definition version 3". FIG. 8 exemplifies the change history of the data definition version detected when a period of 2008 May 1 to 2008 Sep. 20 is designated as an extraction period.

In step S403, the detection unit 201 detects, from the data definition library 206, the data definitions of all the data definition versions in the period to be extracted that have been detected in step S402. FIG. 6 exemplifies the detected data definitions.

In step S404, the extraction unit 202 extracts, from the database 221, apparatus data matching a designated apparatus data item name in the designated period. FIG. 7 exemplifies the apparatus data. Reference numeral 701 denotes apparatus data matching apparatus data item names "wafer X position", "wafer Y position", "wafer X position offset", "wafer Y position offset", "wafer X position correction value", and "wafer Y position correction value" in a period of 2008 Jan. 1 to 2008 Oct. 1. A blank portion 711 means that there are no apparatus data matching item names "wafer X position" and "wafer Y position" for data definition version 3 and subsequent versions. A blank portion 712 means that there are no apparatus data matching "wafer X position offset" and "wafer Y position offset" for data definition version 2 and previous versions. A blank portion 713 means that there are no apparatus data matching item names "wafer X position correction value" and "wafer Y position correction value" for data definition version 3 and previous versions. Reference numeral 702 denotes an apparatus data item name to be extracted. Reference numerals 703 and 704 denote extracted apparatus data. Since the data definition version has changed, the extracted apparatus data 704 contains blank portions 721 and 722 having no apparatus data.

In step S405, a data definition history 801, a data definition 601, and the apparatus data 704 obtained by the detection unit 201 and extraction unit 202 are provided and output to the terminal 230. These data may be output by, e.g., displaying them on a display or printing them.

As for a blank portion having no apparatus data in the apparatus data 704, the user refers to the date and time when the data definition has been changed in the data definition history 801. Then, he can estimate that the blank portion has been generated because of a change of the data definition. For example, the user can presume that the blank portion 721 arises from a change of data definition version 2 to data definition version 3, and the blank portion 722 arises from a change of data definition version 1 to data definition version 2. The user can estimate that the number of digits of a numeral and the order have changed in apparatus data 731 because data definition version 1 has changed to data definition version 2. By referring to the data definition 601, the user can confirm whether his estimation is correct, or find out how to derive apparatus data at a blank portion from another apparatus data.

The data definition 601 may describe contents changed from those of previous data definition versions. From the description of the changed contents, the user can confirm the cause of omission or a change in extracted apparatus data depending on the difference in data definition version.

In step S405, if the data definition 601 contains a data definition concerning an apparatus data item to be extracted, the apparatus data item may be provided to the terminal 230 together with the provided data definition 601. More specifically, the detection unit 201 checks whether there is a data definition corresponding to an apparatus data item to be extracted for each data definition version in a period to be extracted. The terminal 230 can be provided with a detection result 901 as exemplified in FIG. 9.

In step S401 according to the embodiment, an apparatus data item name and period to be extracted are designated, but only the period may be designated. In this case, no apparatus data is extracted. The terminal 230 can be provided with the detection result of a data definition in a period during which at least one of data definition history detection results in the period designated by the detection unit 201 is designated.

Second Embodiment

Figure 10:
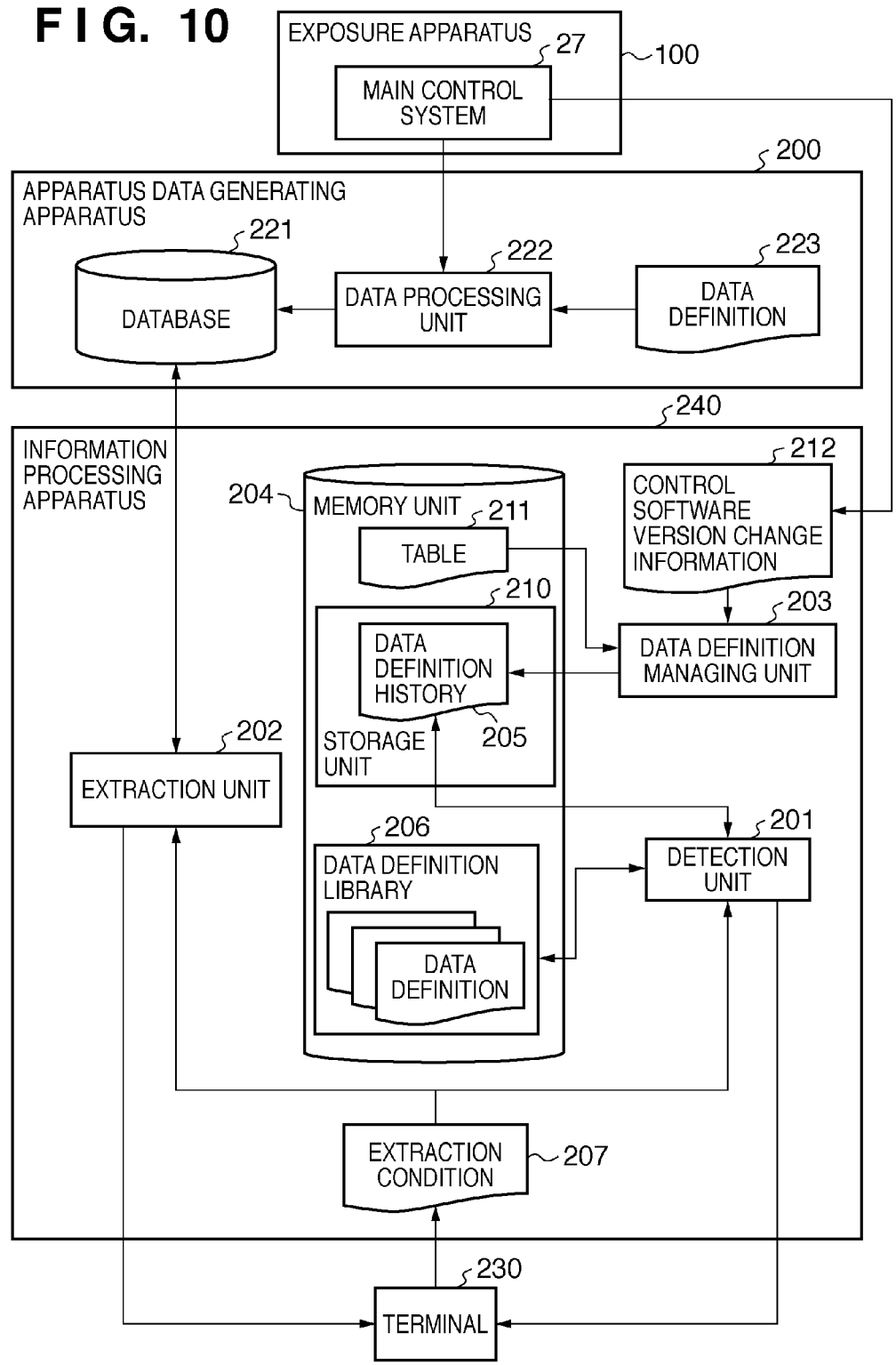
FIG. 10 is a block diagram showing the schematic arrangement of an information processing system according to the second embodiment.

The second embodiment of the present invention will be explained. The first embodiment applies to matters that will not be mentioned in the second embodiment. An information processing system according to the second embodiment will be described with reference to FIG. 10. The information processing system according to the second embodiment of the present invention includes an apparatus data generating apparatus 220 and information processing apparatus 240, and can typically include one or a plurality of terminals 230. The terminal 230 functions as a user interface. When the information processing apparatus 240 has a user interface function, the terminal 230 is not indispensable. The information processing apparatus 240 can be formed from one or a plurality of computers. A system containing the information processing system and a semiconductor manufacturing apparatus can be called a semiconductor manufacturing system. The information processing apparatus 240 or information processing system receives apparatus data from one or a plurality of semiconductor manufacturing apparatuses (exposure apparatus 100 in this case) via a communication interface (not shown) and a communication network (or communication line).

In the second embodiment, a data definition managing unit 203 generates or updates a data definition history 205 based on control software version change information of a main control system 27. The apparatus data generating apparatus 220 is configured as an apparatus having functions corresponding to a communication interface (not shown), database 221, and data processing unit 222 in an information processing apparatus 200 in the information processing system of the first embodiment shown in FIG. 2. The apparatus data generating apparatus 220 generates apparatus data from a log transmitted from the exposure apparatus 100, and records it in the database 221. The information processing apparatus 240 is configured as an apparatus having functions corresponding to a communication interface (not shown), detection unit 201, extraction unit 202, data definition managing unit 203, and memory unit 204 in the information processing apparatus 200 in the information processing system of the first embodiment shown in FIG. 2. The information processing apparatus 240 processes apparatus data recorded in the database 221 of the apparatus data generating apparatus 220.

When the version of control software executed by the main control system 27 has changed, the main control system 27 provides the data definition managing unit 203 of the information processing apparatus 240 with control software version change information 212 describing information which specifies the version and the date and time when the operation of the control software of this version started. In accordance with the changed version of the control software of the main control system 27, the apparatus data generating apparatus 220 generates apparatus data based on the data definition of the data definition version complying with the new control software version. The memory unit 204 stores a table 211 describing the correspondence between the control software version and the data definition version. The data definition of the data definition version complying with the control software version may be provided, for example, from the main control system 27 of the exposure apparatus 100 to the information processing apparatus 240, or to the information processing apparatus 240 via an input device attached to the information processing apparatus 240.

The data definition managing unit 203 generates the data definition history 205 based on the table 211. FIG. 11 exemplifies the correspondence between the control software version and the data definition version. For example, control software "Tool Type 00 Control Ver.3" is assumed to correspond to data definition version 3. A case in which the control software has changed from "Tool Type 00 Control Ver.2" to "Tool Type 00 Control Ver.3" will be examined. In this case, the data definition managing unit 203 records the date and time of the change as the start date and time of data definition version 3 in the data definition history 205. A case in which the control software has changed from "Tool Type 00 Control Ver.3" to "Tool Type 00 Control Ver.4" will be examined. Data definition version 3 corresponds to "Tool Type 00 Control Ver.3" and "Tool Type 00 Control Ver.4". Thus, the data definition version is not changed and no changed data definition version is recorded in the data definition history 205.

A method that allows the user to recognize a data definition in the extraction period is the same as that explained with reference to FIG. 4. Even when the database 221 and data processing unit 222 are arranged in an apparatus different from the information processing apparatus 240, as exemplified in FIG. 10, a data definition in each period can be detected.

As described above, according to the embodiments of the present invention, the user can easily confirm a data definition that changes depending on the period.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-054065, filed Mar. 6, 2009, which is hereby incorporated by reference herein in its entirety.

What is claimed is:

1. An information processing system using apparatus data recorded in a database in accordance with a data definition updated as needed, the system comprising:
    a storage unit configured to store a data definition history that makes a data definition version and a period during which a data definition for the data definition version was used to correspond to each other, the data definition history being updated in accordance with updating of the definition data;
    a data definition library in which the data definition version and the data definition for the data definition version are registered in correspondence with each other; and
    a detection unit configured to detect, from the data definition history, a data definition version of a data definition used in a period designated via a user interface, to detect a data definition for the detected data definition version from the data definition library, and to provide the detected data definition version and data definition to the user interface,
    wherein the apparatus data includes either of data generated by a semiconductor manufacturing apparatus and data obtained by processing the generated data.

2. The system according to claim 1, further comprising an extraction unit configured to extract, from the database, apparatus data matching an extraction condition designated via the user interface and to provide the apparatus data to the user interface,
    wherein the extraction condition includes a period during which apparatus data is to be extracted.

3. The system according to claim 2, wherein the extraction condition includes an apparatus data item name.

4. The system according to claim 1, further comprising a data definition managing unit configured to update the data definition history upon a change of the data definition.

5. The system according to claim 4, wherein the data definition managing unit is configured to register a new data definition in the data definition library upon a change of the data definition in correspondence with a data definition version of the new data definition.

6. The system according to claim 4, wherein the data definition managing unit is configured to update the data definition history upon a change of control software of the semiconductor manufacturing apparatus.

7. An information processing method in an information processing system using apparatus data recorded in a database in accordance with a data definition updated as needed, the information processing system including: a storage unit configured to store a data definition history that makes a data definition version and a period during which a data definition for the data definition version was used to correspond to each other, the data definition history being updated in accordance with updating of the data definition; and a data definition library in which the data definition version and the data definition for the data definition version are registered in correspondence with each other, the apparatus data including either of data generated by a semiconductor manufacturing apparatus and data obtained by processing the generated data, the information processing method comprising steps of:
    detecting, from the data definition history, a data definition version of a data definition used in a period designated via a user interface;
    detecting a data definition for the detected data definition version from the data definition library; and
    providing the detected data definition version and data definition to the user interface.

8. A computer readable memory medium storing a program for causing an information processing system to execute processing for using apparatus data recorded in a database in accordance with a data definition updated as needed, the information processing system including: a storage unit configured to store a data definition history that makes a data definition version and a period during which a data definition for the data definition version was used to correspond to each other, the data definition history being updated in accordance with updating of the data definition; and a data definition library in which the data definition version and the data definition for the data definition version are registered in correspondence with each other, the apparatus data including either of data generated by a semiconductor manufacturing apparatus and data obtained by processing the generated data, the program causing the information processing system to execute processing comprising steps of:
    detecting, from the data definition history, a data definition version of a data definition used in a period designated via a user interface;
    detecting a data definition for the detected data definition version from the data definition library; and
    providing the detected data definition version and data definition to the user interface.

* * * * *